(12) United States Patent
Yamada et al.

(10) Patent No.: US 7,673,896 B2
(45) Date of Patent: Mar. 9, 2010

(54) VEHICLE INTERIOR PANEL

(75) Inventors: Shuji Yamada, Shizuoka (JP); Takahiro Suwama, Shizuoka (JP)

(73) Assignee: Nihon Plast Co., Ltd., Shizuoka (JP)

(*) Notice: Subject to any disclaimer, the term of this patent is extended or adjusted under 35 U.S.C. 154(b) by 233 days.

(21) Appl. No.: 11/455,697

(22) Filed: Jun. 20, 2006

(65) Prior Publication Data
US 2006/0284401 A1 Dec. 21, 2006

(30) Foreign Application Priority Data
Jun. 21, 2005 (JP) ............................. 2005-180040

(51) Int. Cl.
*B60R 21/205* (2006.01)
(52) U.S. Cl. .................................... 280/728.3; 280/732
(58) Field of Classification Search .............. 280/728.3, 280/731, 732
See application file for complete search history.

(56) References Cited

U.S. PATENT DOCUMENTS

| | | | | |
|---|---|---|---|---|
| 4,991,870 | A * | 2/1991 | Beusterien et al. | 280/732 |
| 5,082,310 | A * | 1/1992 | Bauer | 280/732 |
| 5,154,444 | A * | 10/1992 | Nelson | 280/732 |
| 5,172,931 | A * | 12/1992 | Baba et al. | 280/728.3 |
| 5,354,095 | A * | 10/1994 | Muller et al. | 280/728.3 |
| 5,447,328 | A * | 9/1995 | Iannazzi et al. | 280/728.3 |
| 5,499,842 | A * | 3/1996 | Yamamoto et al. | 280/728.3 |
| 5,779,262 | A * | 7/1998 | Totani et al. | 280/728.3 |
| 5,961,143 | A * | 10/1999 | Hlywka et al. | 280/728.3 |
| 5,997,030 | A | 12/1999 | Hannert et al. | |
| 6,065,771 | A * | 5/2000 | Kawakubo et al. | 280/728.3 |
| 6,106,003 | A * | 8/2000 | Rahmstorf et al. | 280/728.3 |
| 6,152,480 | A * | 11/2000 | Iwanaga | 280/728.3 |
| 6,237,933 | B1 * | 5/2001 | Takahashi et al. | 280/728.3 |
| 6,460,875 | B1 * | 10/2002 | Teranishi et al. | 280/728.3 |
| 6,651,998 | B1 * | 11/2003 | Mayer et al. | 280/728.3 |
| 6,726,239 | B1 * | 4/2004 | Teranishi et al. | 280/728.3 |
| 6,976,701 | B2 * | 12/2005 | Gray et al. | 280/728.3 |
| 7,014,901 | B2 * | 3/2006 | Sanae et al. | 428/57 |
| 7,063,349 | B2 * | 6/2006 | Takahashi | 280/728.2 |
| 7,093,850 | B2 * | 8/2006 | Merrifield et al. | 280/728.3 |
| 7,237,797 | B2 * | 7/2007 | Dailey et al. | 280/728.3 |
| 7,275,759 | B2 * | 10/2007 | Sawada | 280/728.3 |
| 7,425,018 | B2 * | 9/2008 | Suwama et al. | 280/728.3 |
| 2001/0011811 | A1 | 8/2001 | Takahashi et al. | |
| 2002/0096867 | A1 | 7/2002 | Kawakubo et al. | |
| 2003/0189321 | A1 | 10/2003 | Takahashi | |
| 2004/0160043 | A1 * | 8/2004 | Litjens et al. | 280/732 |
| 2004/0164531 | A1 * | 8/2004 | Riha et al. | 280/732 |

FOREIGN PATENT DOCUMENTS

| | | |
|---|---|---|
| DE | 19800815 C1 | 2/1999 |
| DE | 29911205 U1 | 8/1999 |
| JP | 2000-142296 A | 5/2000 |
| WO | WO0160664 A1 | 8/2001 |

* cited by examiner

*Primary Examiner*—Paul N Dickson
*Assistant Examiner*—Nicole Verley
(74) *Attorney, Agent, or Firm*—Sughrue Mion, PLLC

(57) ABSTRACT

A vehicle interior panel, which functions as an airbag cover for covering an airbag expanding direction of an airbag apparatus, is comprised of a base member layer having a tearing portion which defines a door portion opened by the expanding of an airbag of the airbag apparatus, a cushion layer laminated on the base member layer, and a skin member laminated on the cushion layer. The skin member having a weak portion functioning as a tearing portion of the skin member. The weak portion being formed outside of a position just above the tearing portion of the base member layer.

13 Claims, 8 Drawing Sheets

FIG.5A (DOUBLE DOOR)

FIG.5B (SINGLE DOOR)

FIG.7A (DOUBLE DOOR)
FIG.7B (SINGLE DOOR)
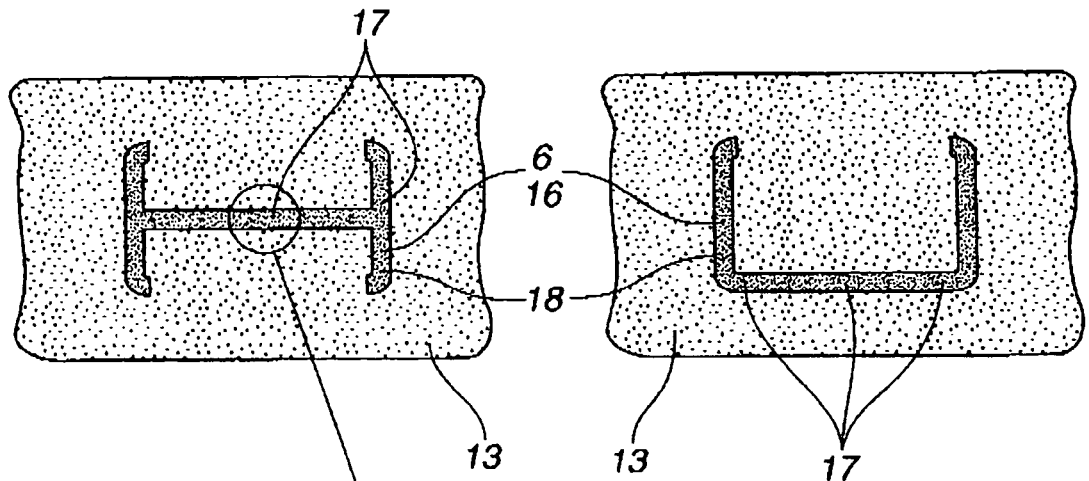
FIG.7C
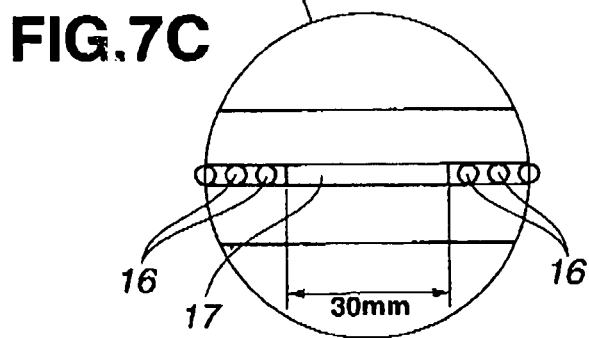
FIG.8
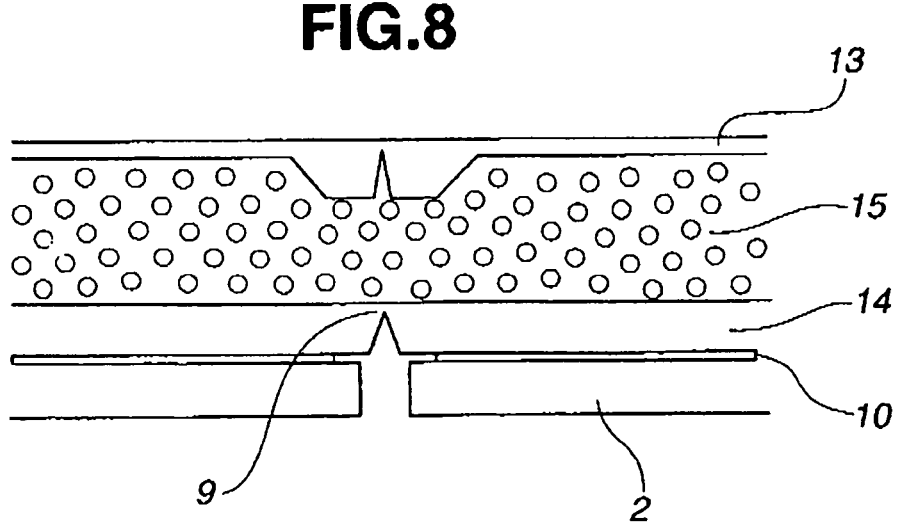

VEHICLE INTERIOR PANEL

BACKGROUND OF THE INVENTION

The present invention relates to a vehicle interior panel inside of which an airbag apparatus is installed.

An airbag apparatus is a popular restraint apparatus for a vehicle passenger, and is commonly arranged to expand an airbag upon detecting an impact in a vehicle collision so as to dispose the inflated airbag between a vehicle body and a vehicle passenger for the purpose of protecting the vehicle passenger from the impact due to the vehicle collision.

In recent years, such airbag apparatuses come widespread use and have become installed at a side wall above a front-door window as a side airbag for protecting a passenger from a lateral directional impact, in addition to an installation of the airbag at a steering wheel for a driver seat and at a vehicle interior panel for a front passenger seat In such airbag apparatuses, the passenger side airbag apparatus installed under the vehicle interior panel has normally produced by separately preparing an airbag cover for covering the airbag apparatus and a vehicle interior panel and by installing the airbag cover in the vehicle interior panel. However, in recent years, there is increased requests for improving manufacturability and external appearance of the passenger side airbag by integrating the airbag cover and the vehicle interior panel There have been proposed various passenger side airbag apparatuses produced by integrating the airbag cover and the vehicle interior panel. For example, Japanese Published Patent Application No. 2000-142296 discloses an integrated structure of an airbag cover and a vehicle interior panel. The integrated panel has been comprised of a cushion layer between a base member and a skin member so as to give a soft and cushioning property to the panel. A door base member is installed at an opening of a panel base member of a vehicle interior panel, and the door base member is opened due to the inflation of an airbag.

SUMMARY OF THE INVENTION

However, as a result of the investigation of the known panel structure by inventors of the present invention, it is proved that in case of a double door structure including the cushion layer between the base member layer and the skin member, the skin member at both sides of an H-shaped door portion tears from a position outside of a tearing planned portion while forming rough broken surfaces.

As a result of various studies as to the panel structure for an airbag apparatus, the inventors of the present invention found that although the tearing of the door portion during the airbag development (inflation) starts by the tearing of a weak portion of the door member and the release of the door member from the panel member, the skin member is then forcibly torn at a portion outside of the tearing planned portion. That is, the cushion layer receives a compression force and a tensile force due to the pushing-up of the airbag door member. Further, the cushion layer has a small extensibility in contrast to a large extensibility of the skin member, and the skin member is stretched against the opening of the door portion. Due to the stretching of the skin member, the tearing position of the skin member is offset from a tearing planned position, and the cushion layer is separated from the skin member and crushed. Therefore such an airbag apparatus has to prevent the release of broken pieces of the cushion layer.

It is therefore an object of the present invention to provide an improved vehicle interior panel for an airbag apparatus, which solves the above-discussed problem. That is, it is an object of the present invention to provide a vehicle interior panel, which includes a cushion layer between a base member and a skin member and which securely and smoothly executes an opening of the airbag cover portion during an inflation of the airbag.

An aspect of the present invention resides in a vehicle interior panel functioning as an airbag cover for covering an airbag expanding direction of an airbag apparatus. The vehicle interior panel comprises a base member layer which has a tearing portion which defines a door portion opened by the expanding of an airbag of the airbag apparatus, a cushion layer which is laminated on the base member layer, and a skin member which is laminated on the cushion layer. The skin member has a weak portion functioning as a tearing portion of the skin member. The weak portion being formed outside of a position just above the tearing portion of the base member layer.

The other objects and features of this invention will become understood from the following description with reference to the accompanying drawings.

BRIEF DESCRIPTION OF THE DRAWINGS

FIGS. 5A, 5B and 5C are explanatory views showing an embodiment of a weak portion of a back face of the skin member.

FIGS. 7A, 7B and 7C are explanatory views showing an embodiment of the weak portion of a back face of the skin member.

FIG. 8 is a cross sectional view showing the weak portion of the skin member, taken along the line B-B in FIG. 1.

DETAILED DESCRIPTION OF THE INVENTION

Figure 1:
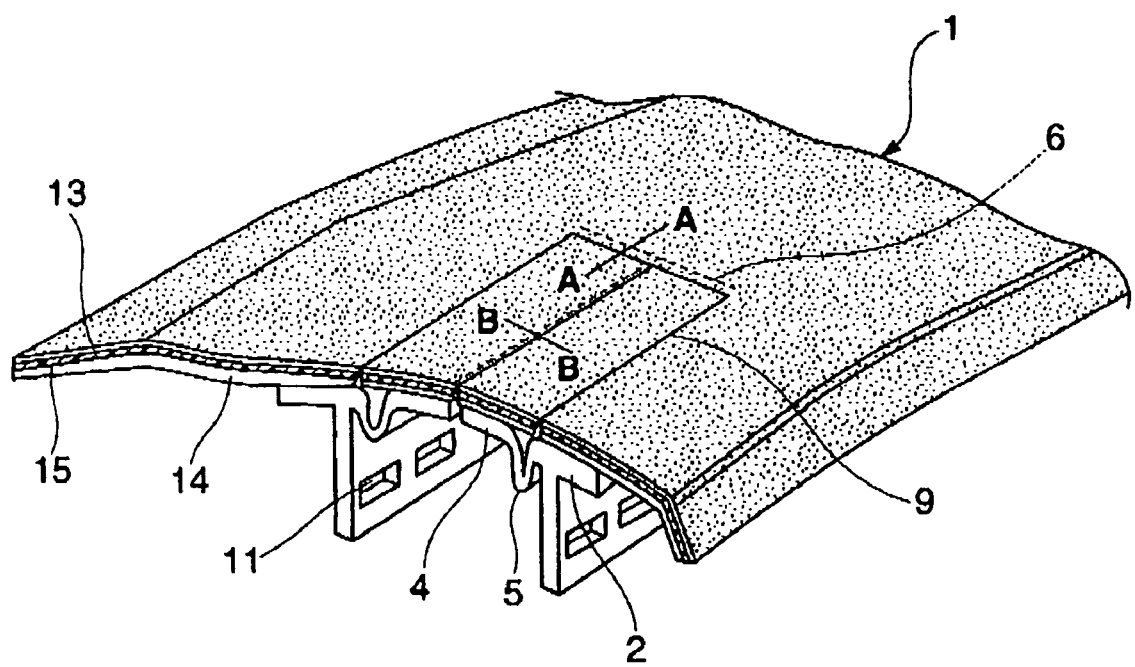
FIG. 1 is a perspective view of a vehicle interior panel integrated with an airbag apparatus in accordance with the present invention.

An important feature of the present invention resides in a position of a weak portion (functioning as a tearing portion) of a skin member of a vehicle interior panel, which functions as an airbag cover member constructed by a base member layer made of hard resin, a cushion layer laminated on the base member layer and a skin made of soft resin laminated on the cushion layer.

In case that the vehicle interior panel is constructed only by a base member layer and a skin member without using a cushion layer, a weak portion is conventionally formed at a position corresponding to a tearing portion of the base member layer. That is, the weak portion of the skin member is formed just above the tearing portion of the base member layer. However, in case that a cushion layer is provided between a base member layer and a skin member, the cushion layer is compressed and the skin member is elongated due to the pushing-up of a door member during the inflation of an airbag. Therefore, if the weak portion is formed at a conventional position as same as that of the panel without a cushion layer, the tearing position of the skin member is shifted (offset) to a position outside of the weak portion, and the panel tends to be forcibly torn at a general position outside of the weak portion.

Accordingly, the function of the weak portion for smoothly developing the airbag and opening the door portion becomes invalid, and the tearing surface of the panel becomes a rough surface due to such a forcible tearing.

Accordingly, it is important that the weak portion is formed at a position outside of a conventional position upon taking account of an offset of the tearing planned position of the skin member, so as to prevent the above described problem from occurring and to naturally open the airbag cover body including the cushion layer of the vehicle interior panel.

It is preferable that the offset quantity of the tearing planned position of the weak portion is positioned on an offset line which extends from the tearing portion of the base member layer while having an offset angle ranging from 15 through 70 degrees with respect to a line extending from the tearing portion of the base member layer in the vertically above direction, although the offset quantity of the tearing planned position is affected by materials of the respective layers of the airbag cover body, and particularly by the strength of the cushion layer and the tensile characteristic and the thickness of the skin member. It is further preferable that the offset angle of the offset line ranges from 34 through 65 degrees. If the offset angle of the offset line with respect to the vertical line is smaller than 15 degrees there is a possibility that the tearing of the skin member is generated at a position outside of the weak portion (tearing planned position) due to the shortage of the offset quantity of the weak portion. Therefore, in this case, it is difficult to sufficiently ensure the certainty and the reliability of the tearing performance of the airbag cover body. If the offset angle of the offset line is greater than 70 degrees, there is a possibility that the actual tearing is generated at a position inside of the weak portion, and thus generating a forcible tearing of the airbag cover. This also becomes difficult to sufficiently ensure the certainty and the reliability of the tearing performance of the airbag cover body According to the present invention, an offset quantity necessary for properly tearing the airbag cover may be selected from a range having the offset angle ranging from 15 to 70 degrees upon taking account of the strength of the cushion layer and the tensile characteristic of the skin member. As discussed above, the offset angle is an angle defined by a line extending from the tearing portion of the base member layer in the thickness direction of the base member layer and a line connecting the tearing position of the base member layer and the weak portion of the skin member. When the employed material of the skin has a characteristic that the elongation is relatively small such as 150%, the offset angle may be set at a small angle. In this case, by controlling the strength of the cushion layer, it becomes possible to further control the offset angle. For example, when the cushion layer is molded from polyurethane foam by means of an reaction injection molding method and when a polyol, whose average molecular weight is small, is employed as a polyol, the cushion layer has a brittle characteristic. Accordingly, in this case, the offset angle may be set almost at 15 degrees, so that the weak portion of the skin is formed at a position immediately outside of the just above position of the tearing position of the base member layer. On the other hand, when a polyol, whose average molecular weight is large, is employed as a polyol, the strength of the cushion layer is increased Accordingly, in this case, the offset angle may be set almost at 35 degrees so that the weak portion of the skin is formed at a position outside of the just above position of the tearing position of the base member layer.

In case that an elongation of the skin member is relatively large such as almost 400%, the offset angle may be set at a larger angle. In this case, by controlling the strength of the cushion layer, it becomes also possible to further control the offset angle. For example, when the cushion layer is molded from polyurethane foam by means of a reaction injection molding method and when a polyol, whose average molecular weight is small, is employed as a polyol, the cushion layer has a brittle characteristic. Accordingly, in this case, the offset angle may be set almost at 60 degrees. On the other hand, when a polyol, whose average molecular weight is large, is employed as a polyol, the strength of the cushion layer is increased. Accordingly, in this case, the offset angle may be set almost at 70 degrees. That is, it is possible to select the offset angle of the weak portion of the skin according to the tensile of the material of the skin member and the strength of the cushion layer.

According to the present invention, it is preferable that the weak portion, which is formed at the above-discussed offset position, is constructed as follows, in view of further improving the reliability of the tearing of the door portion.

Figure 2A:
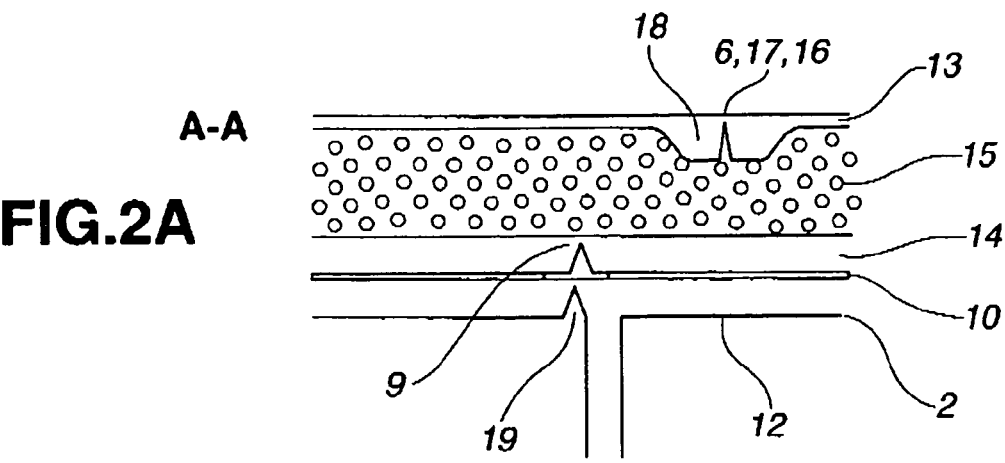
FIGS. 2A, 2B and 2C are cross sectional views for explaining tearing of a vehicle interior panel during an airbag inflation, taken along the line A-A in FIG. 1.
Figure 2B:
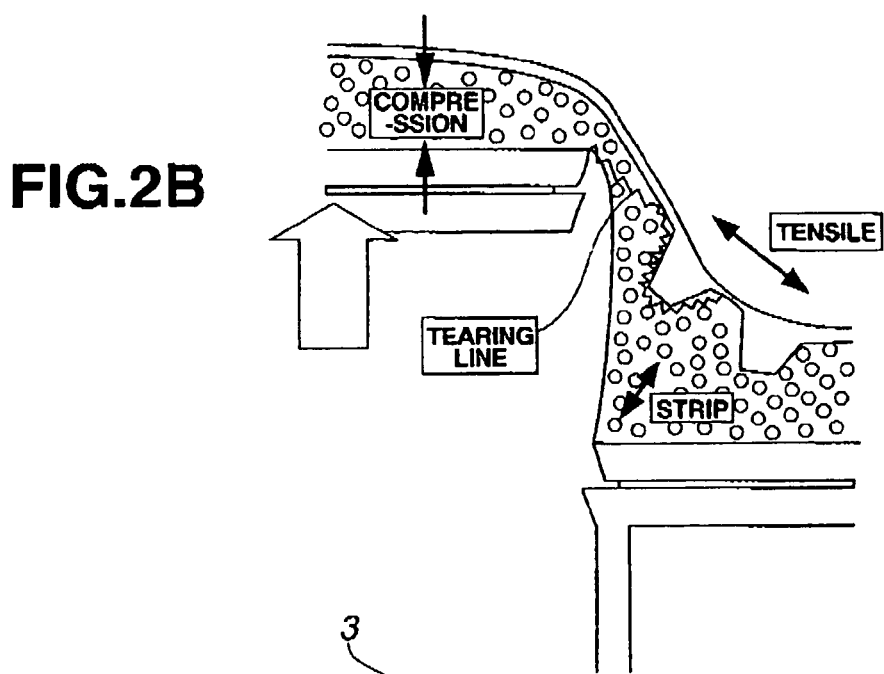
Figure 2C:
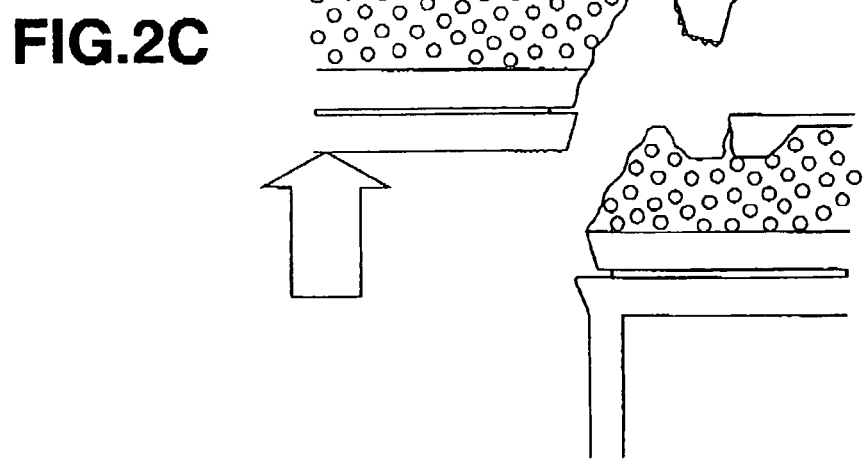

As shown in FIGS. 2A through 2C and the like, the weak portion formed in the skin member is formed at a thick portion of the skin member. Further it is preferable that the thick portion of the skin member is formed into a trapezoid in cross section so as to gradually rise from both sides toward a top.

The vehicle interior panel according to the present invention is constructed by the base member layer, the cushion layer laminated on the base member layer and the skin laminated on the cushion layer. It is preferable that the base member layer has a thickness ranging from 2.5 to 4.0 mm, and is molded from relatively hard material such as PPC resin, which is obtained by reinforcing polypropylene by talc or the like, by means of the injection molding method. As other hard material for the base member, polymer alloy of poly carbonate and ABS resin, maleimide resin (SMA: styrene maleic anhydride copolymer) or denatured polyphenylene oxide may be selected. Further it is preferable that the cushion layer has a thickness ranging from 5 to 10 mm and is molded from foaming material such as urethane foam by means of the reaction injection molding method.

Further it is preferable that the skin member laminated on the base member layer is molded from soft polyurethane resin having a preferable texture by means of the reaction injection molding method. Although the material of the skin member is not limited to the polyurethane, and may be other resin having a soft and preferable texture.

It is preferable that a general portion of the skin member has a thickness ranging from 0.5 to 1.0 mm, the weak portion acting as a tearing planned portion is formed at a thick portion which is thicker than the general portion, and the thick portion has a trapezoidal cross section cut along the lateral direction. Further, it is preferable that the width of the thick portion ranges from 6 to 15 mm, and more preferably ranges from 8 to 10 mm. It is preferable that the width of a top portion of the thick portion ranges from 2.5 to 6.0 mm, and more preferably ranges from 4 to 5 mm. It is preferable that the thickness of the top portion ranges from 2 to 5 mm, and more preferably ranges from 3.5 to 4.5 mm. As to the weak portion formed at the thick portion, it is preferable that a groove width or groove diameter of the weak portion ranges from 0.3 to 2.0 mm, and more preferably, it is a slot or a plurality of holes having a width ranging from 0.5 to 1.5 mm. As to a remaining thickness of the skin at a bottom portion of the groove portion, it is preferable that the remaining thickness ranges from 0.3 to 1.0 mm, and more preferably ranges from 0.5 to 0.8 mm.

According to the present invention, it is preferable that the weak portion has a two step structure, that is, a second weak part of a tapered tip is formed at a bottom end of a first weak part formed into a continuous groove. It is preferable that the second weak part is selectively formed into a continuous groove or discontinuous grooves according to the applied portion. For example, it is preferable that the second weak part at a crossing position of the tearing planned portions is formed into a continuous groove so as to smoothly execute a tearing at the tearing planned portion.

Since the skin member is thin and particularly very thin at the tearing planned portion, it is preferable that the polyurethane resin material for the skin member has a low viscosity performing a high flow ability and has a small shrinkage ratio. Further it is preferable that the skin member is molded using such material by means of an injection molding or reaction injection molding.

The molding of the cushion layer is executed by setting (inserting) the base member layer and the skin member in a cushion molding die and by injecting the material of the cushion layer into a space between the base member layer and the skin member. It is preferable that the material fills an inner portion of the depressed portion of the skin member during the molding so that the cushion layer is formed at the depressed portion. By this arrangement it becomes possible to prevent the depressed portion from degrading an external appearance of the airbag cover member.

In case that the cross-section of the thick portion along the lateral direction is formed into a trapezoidal shape according to the present invention, it becomes possible to further certainly prevent the skin member having the characteristic of soft, thin and low strength from tearing over the tearing planned portion and toward a range outside the tearing planned portion.

By this arrangement of the tearing planned portion, it becomes possible to further certainly and smoothly develop the airbag without generating undesired tearing for tearing the skin member at a position outside of the tearing planned portion due to the pushing-up of the airbag during the operation of the airbag apparatus, even if the panel functioning as an airbag cover has a three-layer structure of including the cushion layer between the base member layer and the skin member of a thin and weak layer.

The weak portion functioning as the braking planned portion is formed according to the shape of the door portion of the airbag apparatus. Therefore, in case of a single door, the weak portion is formed into a U-shape (spade-lug shape), and in case of double doors, the weak portion is formed into H-shape,

EMBODIMENT

Hereinafter, there is discussed an embodiment of the vehicle interior panel according to the present invention with reference to the drawings.

FIG. 1 is a perspective view showing a vehicle interior panel of the present invention, which is integrated with an airbag apparatus. FIGS. 2A, 2B and 2C are cross sectional views taken along the line A-A in FIG. 1 and explanatory views for explaining the condition of the vehicle interior panel during the operation of the airbag apparatus. More specifically, FIG. 2A shows a normal condition. FIG. 2B shows a pushed condition in that an expanding airbag pushes up the vehicle interior panel, the cushion layer receives a compression force and a tensile force, and the skin receives the tensile force. FIG. 2C shows a tearing condition in that the cushion layer and the skin member are torn at the weak portion functioning as a tearing planned portion due to the push-up of the airbag.

Figure 3:
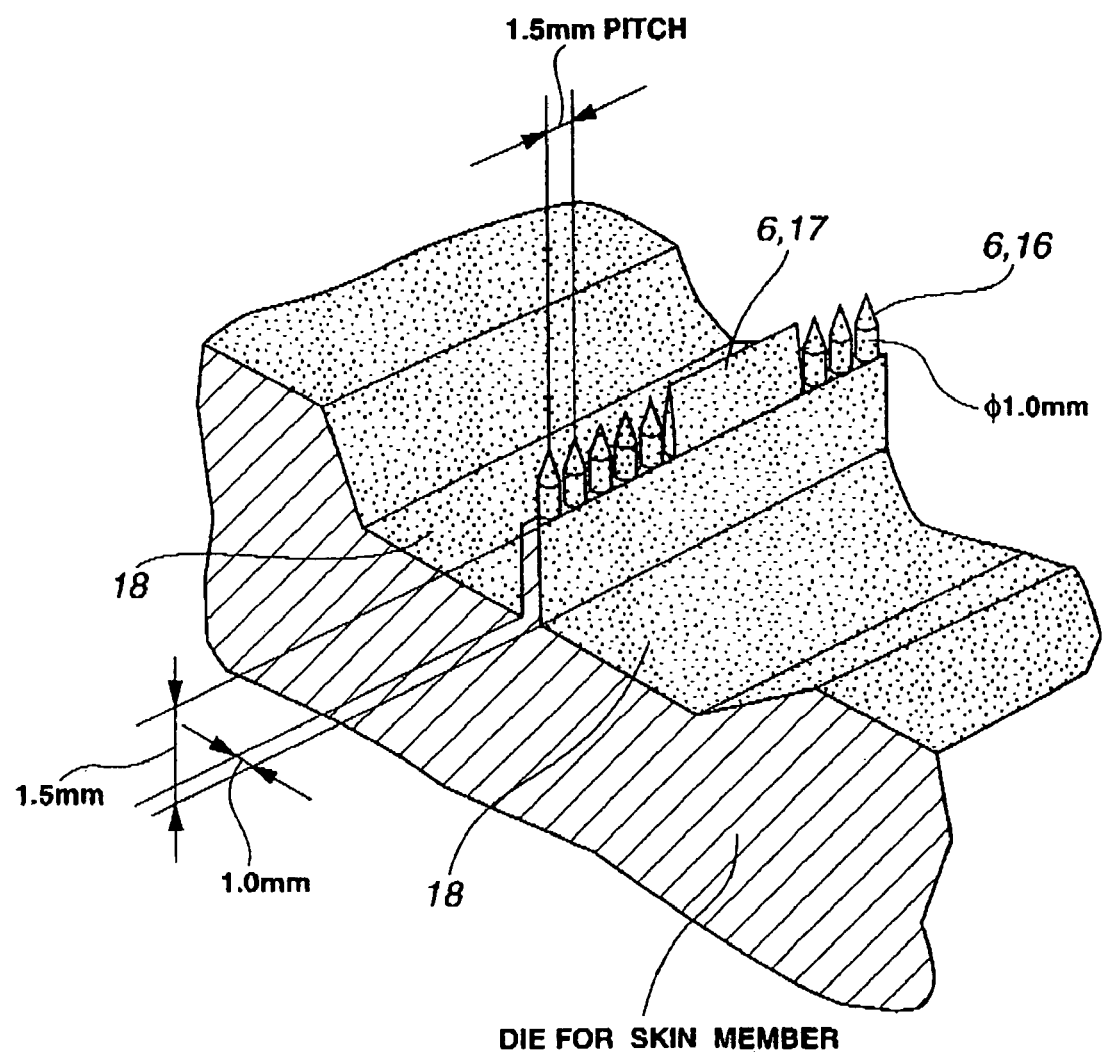
FIG. 3 is a perspective view showing a die for molding a skin member of the vehicle interior panel according to the present invention.
Figure 4:
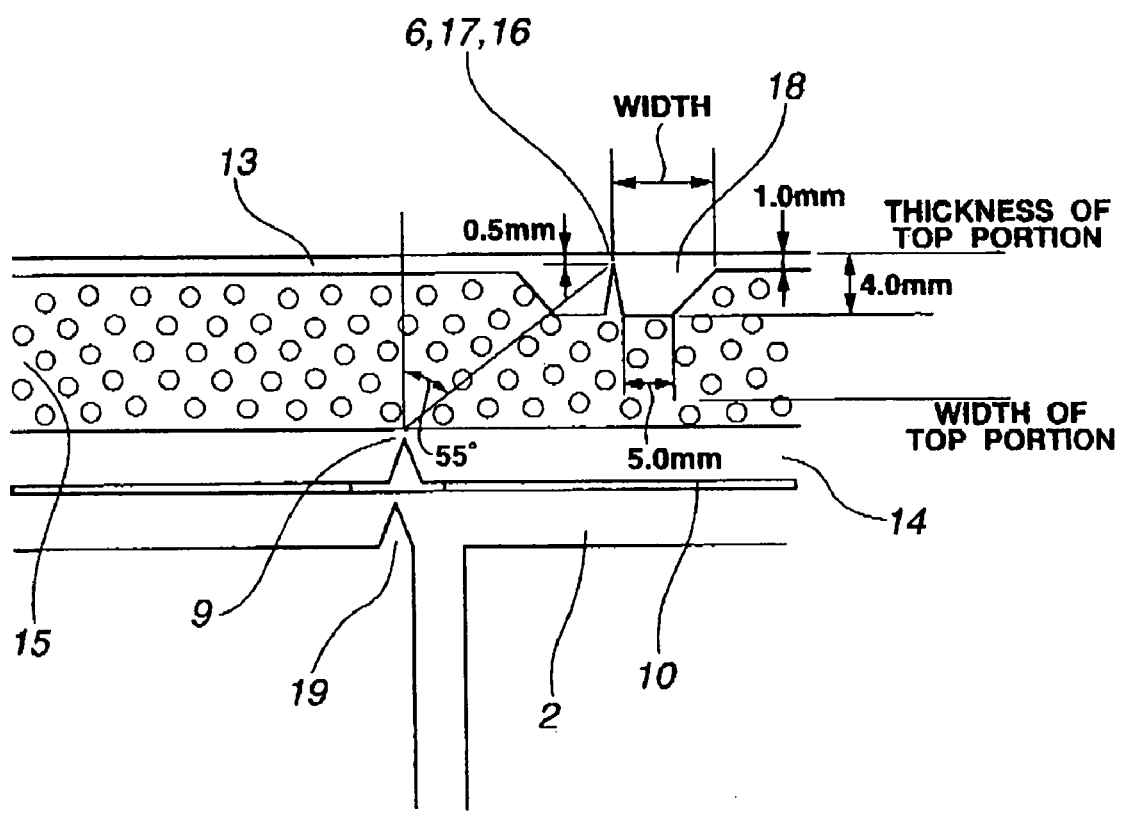
FIG. 4 is a cross sectional view showing the vehicle interior panel including a skin molded by a core type die, taken along the line A-A in FIG. 1.
Figure 5C:
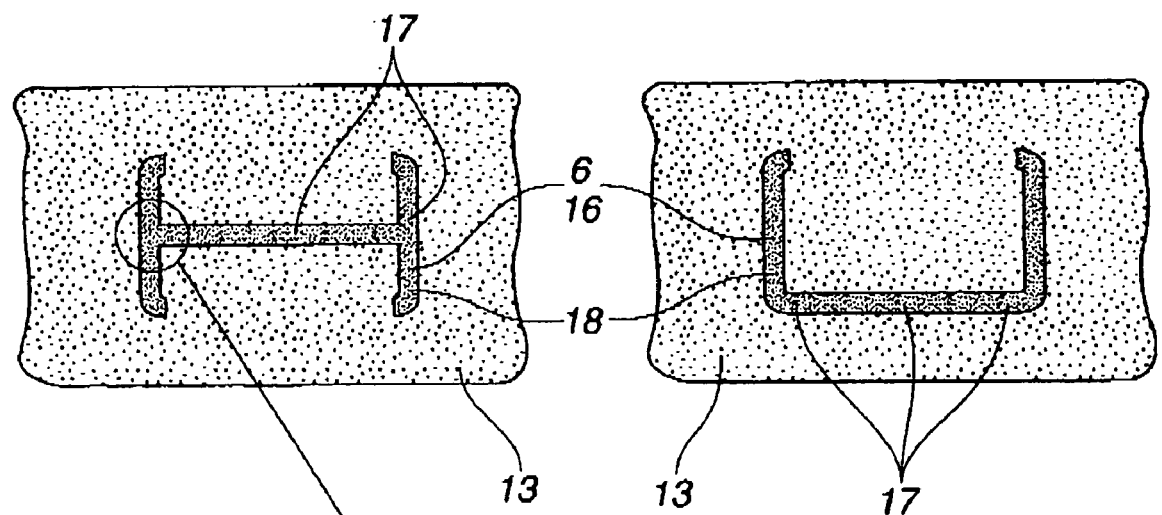
Figure 5C:
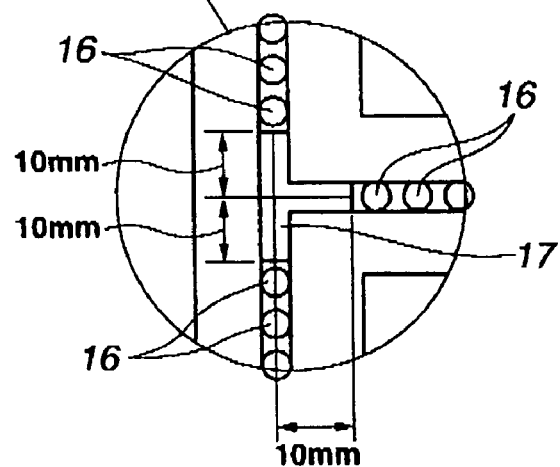
Figure 6:
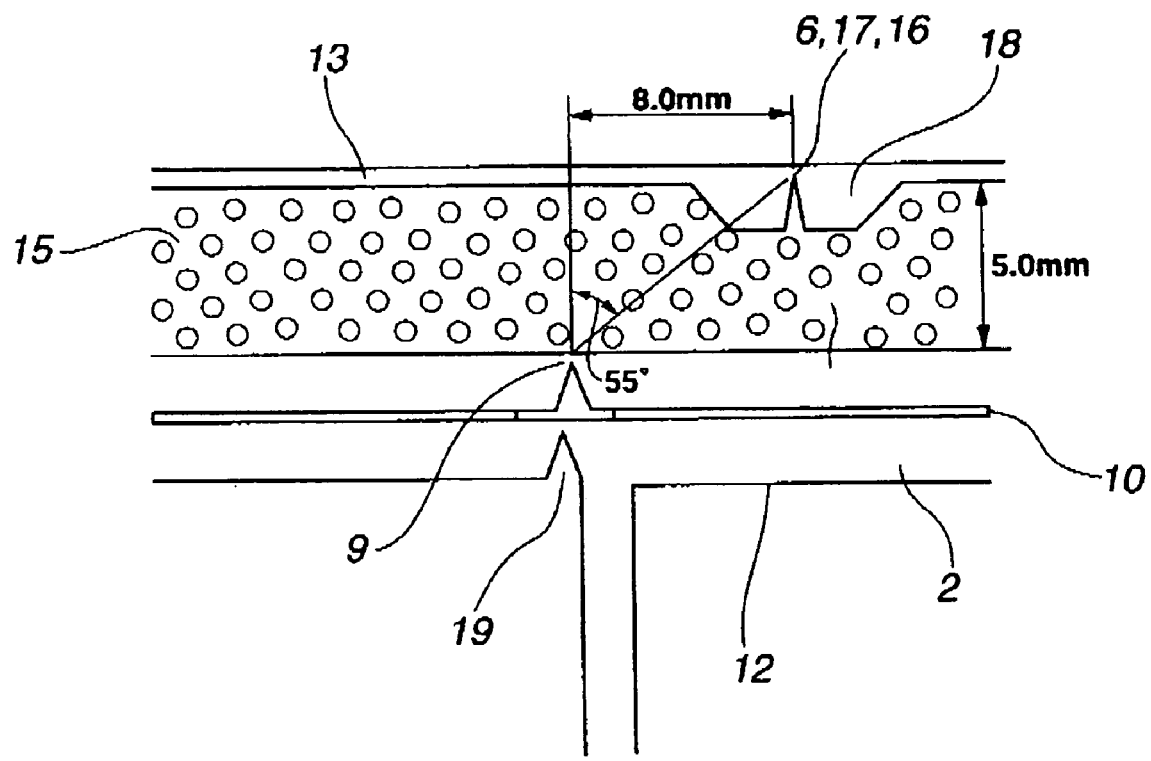
FIG. 6 is a cross sectional view showing the weak portion of the skin member, taken along the line A-A in FIG. 1.

FIG. 3 shows a die (core side die) for molding the skin member employed in the vehicle interior panel according to the present invention. FIG. 4 shows an embodiment of the vehicle interior panel which comprises the skin molded using the die shown in FIG. 3, and is a cross sectional view, taken along the line A-A in FIG. 1, for explaining the weak portion of the skin in detail. FIGS. 5A, 5B and 5C are explanatory views for explaining a structure of a back surface of the skin of the vehicle interior panel according to the present invention. FIG. 5A shows a shape of the weak portion of the skin member applied to a double-door type vehicle interior panel. FIG. 5B shows a shape of the weak portion of the skin member applied to a single-door type vehicle interior panel. FIG. 5C shows a detailed structure of the weak portion at a circle (crossing portion) in FIG. 5A. As is clearly shown in FIG. 5C, a crossing portion of the weak proportion is constructed by a continuous groove. FIG. 6 is also a cross sectional view, taken along the line A-A in FIG. 1, for explaining the weak portion of the skin member in detail. FIGS. 7A, 7B and 7C are also explanatory views for explaining a structure of a back surface of the skin member of the vehicle interior panel according to the present invention. FIG. 7C shows a detailed structure of the weak portion at a circle (crossing portion) in FIG. 7A. As is clearly shown in FIG. 7C, a center portion of the weak portion is constructed by a continuous groove. FIG. 8 is a cross sectional view taken along the line B-B in FIG. 1 and is an explanatory view for explaining the structure of the back surface of the weak portion of the skin member. In Figures, reference numeral 1 denotes a vehicle interior panel, 2 a soft resin inner (a supporting member of a door portion), 3 a door portion, 4 a door reinforcing portion, 5 a hinge portion, 6 a skin tearing planned line, 9 a tearing portion of a base member layer, 10 a connecting portion, 11 a retainer fixing hole, 12 an outer peripheral portion of the soft resin inner, 13 a skin member, 14 a hard resin base member layer, 15 a cushion layer, 16 a discontinuous groove portion, 17 a continuous groove portion, and 18 a skin thick portion.

As shown in FIG. 1, the vehicle interior panel 1 comprises the base member layer 14 made of hard resin, the cushion layer 15 made of plastic foam such as polyurethane foam, and the skin member 13. More specifically, the vehicle interior panel 1 constructed by laminating the cushion layer 15 on the base member layer 14 and by further laminating the skin member 13 on the cushion layer 15. The door reinforcing portion 4 and the supporting portion 2 of the door portion 3, which are connected through the hinge portion 5, are connected to a back surface of the base member layer 14 of the vehicle interior panel 1.

As shown in FIG. 2A, the skin member 13 comprises the thick portion 18 at which the tearing planed portion (tearing planned line) 6 is formed. The tearing planned portion (weak portion) 6 is constructed by the discontinuous groove portion 16 and the continuous groove portion 17. The thick portion 18 including the weak portion 6 is formed outside of a position just above the tearing portion 9 of the base member layer 14. More specifically, at both sides of an H-shaped weak portion 6 of a double door type is outwardly offset from the position just above the tearing portion 9 of the base member layer 14.

With the thus arranged vehicle interior panel 1 according to the embodiment of the present invention, the weak portion 6 of the skin member 13 is offset from the just above position of the braking planned portion 9 of the base member layer 14 toward the outside thereof upon taking account a situation that the position at which the skin member 13 stretches and tears as shown in FIGS. 2A through 2C. That is, the weak portion 6 is formed at a position according to the offset of the tearing of the cushion layer. This prevents the separation between the skin member 13 and the cushion layer 15, which is caused by the stretching separation, and enables the vehicle interior panel 1 functioning as an airbag cover to be smoothly broken along the weak portion 6 of the skin member 13 as planned.

Figure 9A:
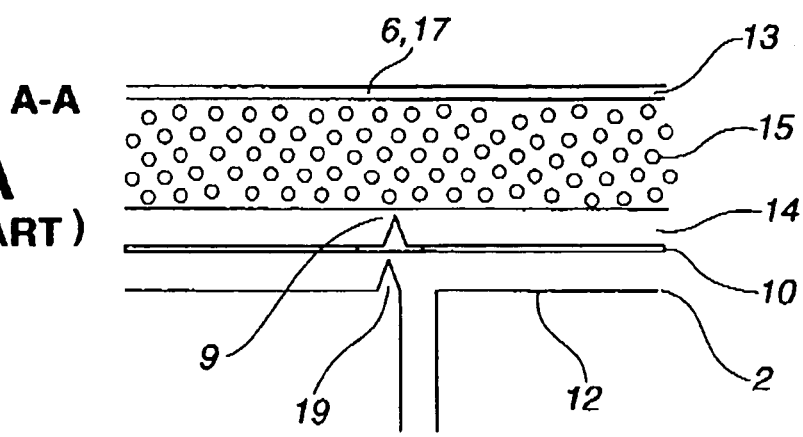
FIGS. 9A, 9B and 9C are cross sectional views for explaining tearing of a comparative vehicle interior panel during an airbag inflation.
Figure 9B:
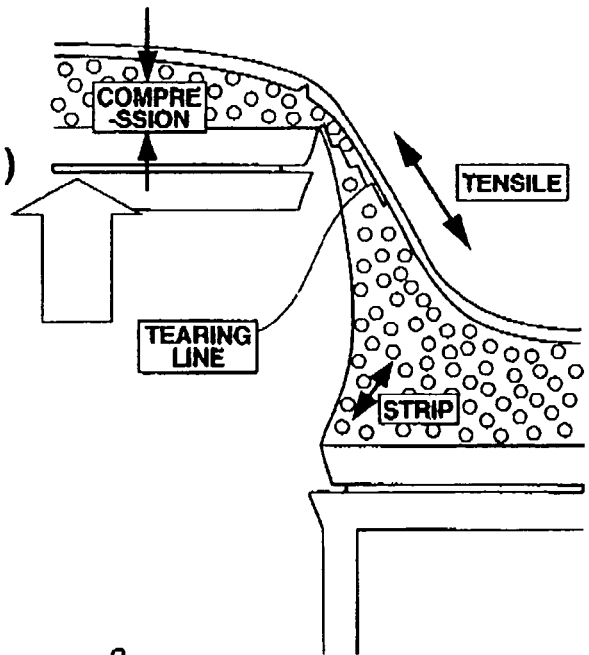
Figure 9C:
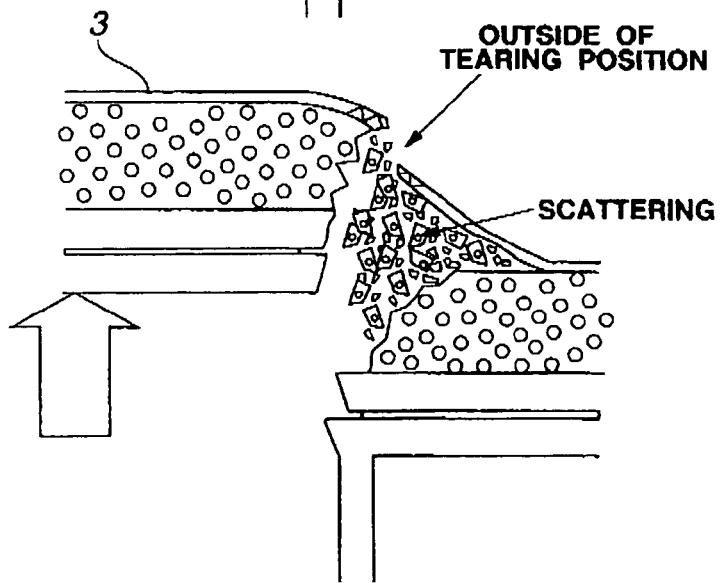

In contrast to this, in case that the weak portion of the skin member is formed at a position corresponding to the breaking portion of the base member layer as shown in FIGS. 9A through 9C which show a related art of the vehicle interior panel functioning as an airbag cover, that is, when the weak portion is formed at a position just above the tearing portion of the base member layer, the skin member is stretched and deformed due to the pushing-up of the door portions while resisting the tearing of the skin member Therefore, the skin member is forcibly torn at a position outside of the weak portion (tearing planned portion) due to the influence of the stretch of the skin member, except for the weak portion of the tearing planned portion. Therefore, the cushion layer constructed by a foamed member having a small tensile characteristic is separated from the skin member and is broken into pieces.

The vehicle interior panel 1 shown in FIG. 1 in accordance with the embodiment of the present invention shown in FIG. 1 is produced as follows.

Firstly, the skin member 13 is molded by the injection molding or reaction injection molding using a die arranged to form a tearing planned portion in the skin member 13 the employed die corresponds to the structure of the weak portion 6 of the skin member 13 as shown in FIG. 3, and comprises a depress portion corresponding to the trapezoidal thick portion, a thin-wall protruding portion continuously formed at the center portion corresponding to the groove portion, and a tip end pins or a second groove, which are formed on the protruding portion.

Since the skin member 13 according to the present invention includes a very thin portion and is produced using the die shown in FIG. 3 and using polyurethane material, it is preferable that the viscosity of the used polyurethane material is in a range from 500 to 1000 centipoises under a melted condition in an injection molding machine including the molding die. It is preferable that the shrinkage ratio after the molding is small as possible. For example, it is preferable that the shrinkage ratio of the selected material is in a range from 3/10000 to 8/10000. Further, in order to ensure a smooth tearing, it is preferable that a specific gravity of the material for the skin member 13 is 0.8 or more, the material is non-foaming or very little foaming characteristic, and the tensile strength thereof is 70 kgf/cm² or less. As to an elongation, it is preferable that the elongation of the material for the skin member 13 ranges from 150 to 400%, and more preferable that it ranges from 150 to 250%. The measurements of the tensile load and the elongation of the material for the skin member 13 were on the basis of JIS K 6301 (Japanese Industrial Standard).

The skin member 13 of the vehicle interior panel 1, which was actually used in the experiment of developing an airbag, had a characteristic that an elongation characteristic at room temperature was 210%, and the tensile strength was 30 kgf/cm².

Subsequently, the base member layer 14 is produced by injection molding using polypropylene adding talc as a filler.

Finally, by inserting the skin member 13 and the base member layer 14 in the die and by injecting polyurethane foam between the skin member 13 and the base member layer 14, the cushion layer 15 is molded, and therefore the vehicle interior panel 1 showing in FIG. 1 is produced.

Although the vehicle interior panel according to the embodiment of the present embodiment has been shown and described such that the weak portion 6 is formed on the cushion-layer-side surface of the skin member 13, which faces with the cushion layer 15, the invention is not limited to this, and the weak portion 6 may be formed on an outer surface of the skin member 13, which faces with a passenger compartment, or may be formed on a cushion-layer-side surface of the base member layer 14, which faces with the cushion layer 15.

This application is based on Japanese Patent Application No. 2005-180040 filed on Jun. 21, 2005 in Japan. The entire contents of this Japanese Patent Application are incorporated herein by reference.

Although the invention has been described above by reference to certain embodiments of the invention, the invention is not limited to the embodiments described above. Modifications and variations of the embodiments described above will occur to those skilled in the art, in light of the above teaching. The scope of the invention is defined with reference to the following claims.

What is claimed is:

1. A vehicle interior panel functioning as an airbag cover for covering an airbag expanding direction of an airbag apparatus, the vehicle interior panel comprising:
   a base member layer having a tearing portion which defines a door portion opened by the expanding of an airbag of the airbag apparatus;
   a cushion layer laminated on the base member layer and having no cuts or grooves extending entirely through its thickness; and
   a skin member laminated on the cushion layer, the skin member having an outer surface that has no cut or groove and having a weak portion extending toward the outer surface from the cushion layer and functioning as a tearing portion of the skin member, the weak portion comprising a cut or groove formed on an inner surface of the skin layer, and formed outside of a position just above the tearing portion of the base member layer,
   wherein the weak portion comprises a tearing portion opened only by the expanding of the airbag of the airbag apparatus.

2. The vehicle interior panel as claimed in claim 1, wherein the skin member is made of polyurethane resin.

3. The vehicle interior panel as claimed in claim 1, wherein the weak portion is formed within a range having an offset angle ranging from 15 to 70 degrees wherein the offset angle is an angle defined by a first line extending from the tearing portion of the base member in the thickness direction of the base member and a second line extending from the tearing portion of the base member layer through the cushion layer to the weak portion of the skin member.

4. The vehicle interior panel as claimed in claim 3, wherein the offset angle is set larger as an elongation of the skin member is larger; and the offset angle is set larger as a strength of the cushion layer is larger.

5. The vehicle interior panel as claimed in claim 1, wherein the weak portion includes a groove portion formed at a thick portion which is thicker than general portions of the skin member, said groove portion extending into but not entirely through said thick portion.

6. The vehicle interior panel as claimed in claim 1, wherein the weak portion is offset outwardly at both sides of the weak portion formed into an H shape.

7. The vehicle interior panel as claimed in claim 1, wherein the weak portion is offset outwardly at all sides of the weak portion formed into a U shape.

8. The vehicle interior panel as claimed in claim 1, wherein the weak portion is formed on a surface facing with the cushion layer.

9. The vehicle interior panel as claimed in claim 1, wherein the weak portion comprises at least continuous grooves.

10. The vehicle interior panel as claimed in claim 1, wherein the weak portion comprises at least discontinuous grooves.

11. The vehicle interior panel as claimed in claim 1, wherein the door portion is disposed between two support members, and wherein a hinge portion of the door portion is also disposed between the support members.

12. The vehicle interior panel as claimed in claim 11, wherein the door portion comprises two door reinforcing portions, each being connected through a hinge portion to a support portion, each support portion being coupled to a respective support member.

13. A vehicle interior panel functioning as an airbag cover for covering an airbag expanding direction of an airbag apparatus, the vehicle interior panel comprising:

a base member layer having a tearing portion which defines a door portion opened by the expanding of an airbag of the airbag apparatus;

a cushion layer laminated on the base member layer and having no cuts or grooves extending entirely through its thickness; and a skin member laminated on the cushion layer, the skin member having an outer surface that has no cut or groove and having a weak ortion extending toward the outer surface from the cushion layer and functioning as a tearing portion of the skin member, the weak portion being formed outside of a position just above the tearing portion of the base member layer, wherein the weak portion includes a groove portion formed at a thick portion which is thicker than general portions of the skin member, said groove portion extending into but not entirely through said thick portion, wherein the thick portion has a cross section of a trapezoidal shape.

* * * * *